(No Model.) 2 Sheets—Sheet 1.

J. P. ALLEN, Sr.
SEED PLANTER OR GUANO DISTRIBUTER.

No. 516,639. Patented Mar. 20, 1894.

WITNESSES:
Chas. Niola
C. Sedgwick

INVENTOR
J. P. Allen Sr
BY
Munn & Co
ATTORNEYS.

THE NATIONAL LITHOGRAPHING COMPANY,
WASHINGTON, D. C.

(No Model.) 2 Sheets—Sheet 2.
J. P. ALLEN, Sr.
SEED PLANTER OR GUANO DISTRIBUTER.
No. 516,639. Patented Mar. 20, 1894.
*Fig: 6.*
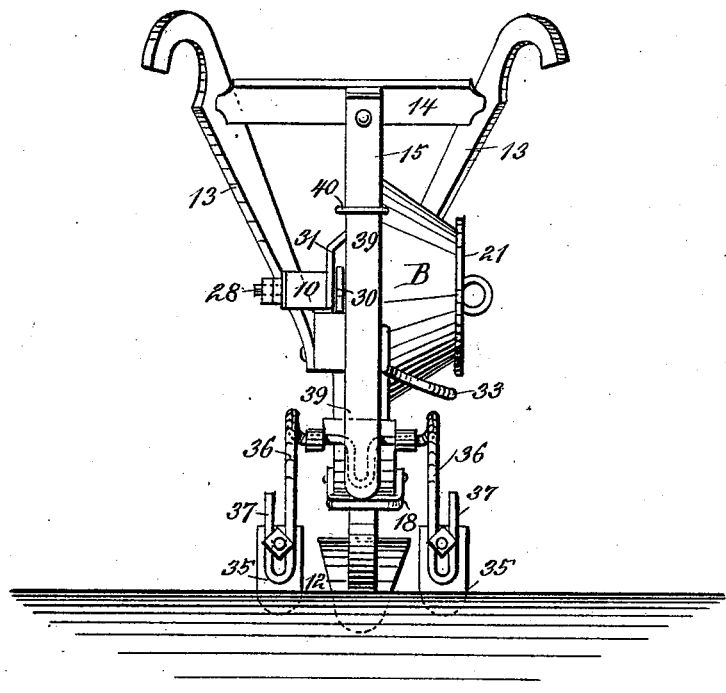
WITNESSES:
Chas. Nida.
C. Sedgwick
INVENTOR
J. P. Allen Sr.
BY Munn & Co.
ATTORNEYS.

UNITED STATES PATENT OFFICE.

JOHN P. ALLEN, SR., OF DAWSON, GEORGIA.

SEED-PLANTER OR GUANO-DISTRIBUTER.

SPECIFICATION forming part of Letters Patent No. 516,639, dated March 20, 1894.

Application filed May 29, 1893. Serial No. 475,862. (No model.)

*To all whom it may concern:*

Be it known that I, JOHN P. ALLEN, Sr., of Dawson, in the county of Terrell and State of Georgia, have invented a new and Improved Seed-Planter or Guano-Distributer, of which the following is a full, clear, and exact description.

My invention relates to a seed planter and fertilizer distributer, and it has for its object to construct a machine in such manner that it will deliver cotton seed, corn, peas, and other seed and grain, likewise guano and other fine fertilizers, uniformly in drills and in greater or less quantities as may be desired.

A further object of the invention is to improve upon the construction of the planter and fertilizer patented to myself January 11, 1881, No. 236,528, and to provide a means whereby the amount of seed and fertilizer to be distributed may be expeditiously and conveniently controlled, and whereby further the covering plows will be so constructed that when they meet with an obstacle they will readily surmount it and automatically return to their normal or covering position, and whereby further the covering plows may be thrown upward from possible contact with the ground when such position is desirable.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
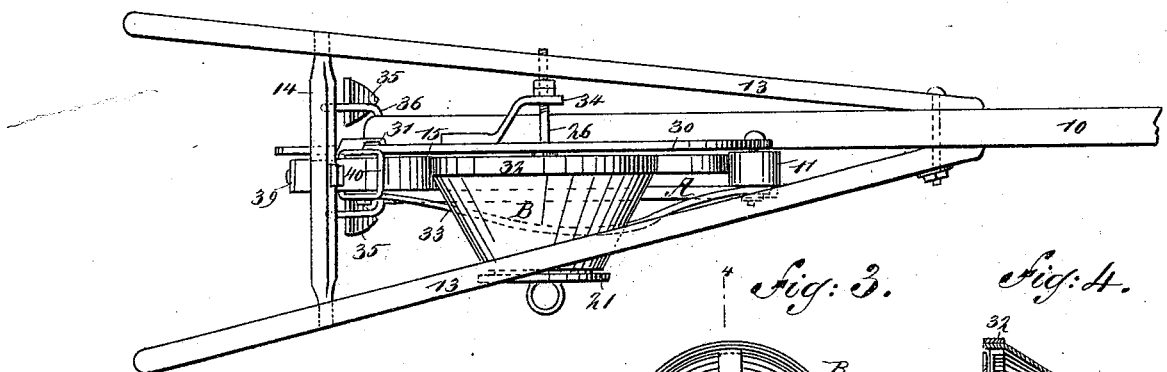
Figure 3:
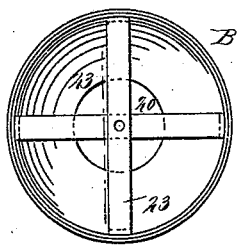
Figure 4:
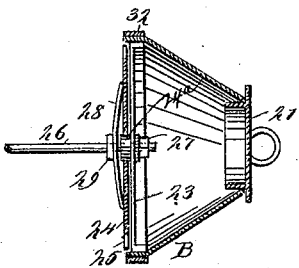
Figure 2:
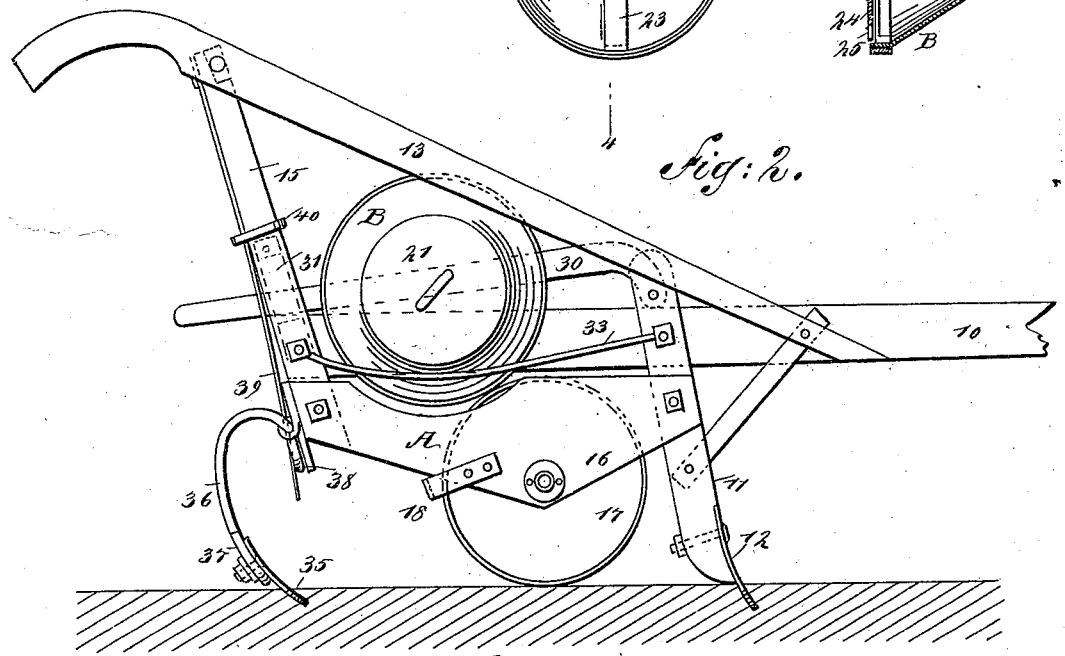
Figure 5:
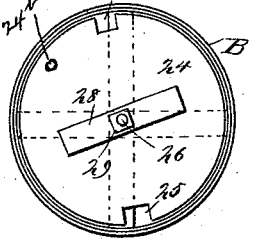

Figure 1 is a plan view of the machine. Fig. 2 is a side elevation thereof. Fig. 3 is a side view of the seed and fertilizer box, the regulating plate being removed therefrom. Fig. 4 is a vertical section through the complete box, the section being taken practically on the line 4—4 of Fig. 3; and Fig. 5 is a side elevation of the complete box, illustrating the manner in which the amount of material to be dropped from the box is regulated. Fig. 6 is an end view of the machine.

In carrying out the invention the plow beam 10, may be of any material or of any desired length, and the said beam has attached to it at any desired point between its ends a plow standard 11, the said standard carrying at its lower end the opening plow 12. The handles 13, are projected upward and rearward from opposite sides of the beam in advance of the plow standard 11, and are connected near their upper ends by a cross bar 14, and the said cross bar is secured at or near its center to the upper end of the handle standard 15, which latter standard is secured upon the beam at the heel or rear end thereof, and preferably upon the same side as the plow standard 11. The handle standard extends downward below the beam, and a guide box A, is formed beneath the beam by attaching side boards 16, at each side of the handle standard at its lower end, and likewise securing said side boards to opposite sides of the plow standard 11. The upper edge of one side board is preferably brought to bear against the under face of the plow beam. The side boards 16, are usually provided with an angular lower edge, and near the lowest point in the side boards the trunnions of a wheel 17, are journaled, which wheel extends within the guide box A, as shown in Fig. 2; and the upper portion of the wheel is preferably made to turn substantially flush with the upper edge of the box. A scraper 18, usually of the yoke pattern, is secured to the lower edge of the box back of the wheel, which scraper crosses the periphery of the wheel, and is adapted to remove from its periphery any earth or other matter that may adhere thereto.

In connection with the plow beam and plow a seed box B, is employed, shown in detail in Figs. 3, 4 and 5. This seed box is shaped substantially as the frustum of a cone, being provided with an opening 20 at its contracted end, normally closed by a removable cover 21, which cover is usually held in position by frictional contact with the walls of the opening 20, as illustrated in Fig. 4, and the seed or fertilizer, or whatever material is to be distributed, is introduced into the box B through the opening 20. The larger end of the body of the box is open, but is provided with a spider 23, permanently attached to it, and said spider comprises usually two or more bars which cross one another at the center and are secured at their ends to the interior of the box.

The amount of seed or fertilizer to be distributed is controlled through the medium of what I call a cap or regulating disk or plate 24. This plate or disk is adapted to normally close the larger open end of the box and rests upon the spider 23. In opposite edges of the disk recesses 25, are formed, as is best shown in Fig. 5, and through these recesses the seed or fertilizer finds its escape. When the recesses 25 in the regulating disk are brought over the bars of the spider, the contents of the seed box can not escape, and the amount that may escape is regulated by the area of the recesses extending beyond the spider bars. Usually the recesses are so placed that when the disk is revolved to carry the recessed portions from a spider bar, one recess will be at one side of the bar while the opposite recess will be adjacent to the opposite side of the same bar, as clearly shown in Fig. 5.

The box is held to turn upon a short shaft 26, and the shaft is made to pass through the regulating disk at its center, and through the central portion of the spider. The shaft is provided upon its inner end with a head or a nut, a nut being illustrated in the drawings and it is clearly shown in Fig. 4, being designated as 27; and a spring 28, is likewise mounted upon the shaft 26, which spring is preferably of the bow pattern, and has bearing upon the outer face of the regulating disk, the tension of the spring upon the disk being regulated by an adjusting nut 29, located upon the shaft and having bearing against the disk. The regulating disk is not mounted to turn directly upon the shaft but upon a washer 24$^a$ secured upon the shaft or loosely placed thereon, which washer is much wider than the thickness of the disk as shown in Fig. 4. The disk is also provided with a knot 24$^b$ by means of which it may be turned readily. The shaft is journaled in a lever 30, which lever at its forward end is fulcrumed preferably upon the upper end of the plow standard 11; and the rear end of the lever extends through a suitable guide strap 31, located upon one side of the handle standard 15; the said guide strap may be provided with a rack surface, if in practice it is found desirable, in order to hold the lever in a lower or an upper position. The exterior surface at the wider end of the seed box is flattened, or is provided with an attached tire 32, and when the lever is in its lowest position the tire 32 of the seed box will be in engagement with the periphery of the wheel 17, and as the wheel is revolved the box will be revolved likewise. When the box is moved out of the engagement with the wheel by the lever it ceases to revolve. The enlarged portion of the box is preferably made to face the adjusting lever, while the body of the box is supported to a greater or less extent in its lower position by means of a supporting rod 33, extending from one standard to the other, and said rod is also employed as a guard, preventing the box from striking stumps when carelessly handled. The shaft 26, carrying the seed box, in addition to being journaled in the lever 30, is likewise journaled in a bracket 34, projected from the outer side of the lever, and on the outer end of the shaft a lock and a jam nut are preferably located.

The covering plows 35, are mounted upon the members of a practically U-shaped standard 36, the said members being curved in a downwardly and forwardly direction, and their lower ends are formed with links 37, in which links the plows are adjustably secured. The bow portion of the U-standard is below the plane of the upper faces of its members, and the said bow portion of the standard is provided with crank arms 38. The standard is pivotally connected with the lower portion of the handle standard at the rear thereof, the connection between the handle standard and the standard of the covering plows being effected at each side of the crank arm of the latter; and a spring 39 has a constant bearing upon the crank arm of the covering plow standard, which spring extends along the rear face of the handle standard, and is secured thereto at its upper end, and the degree of tension that the spring shall exert upon the covering plow standard is regulated by a ring 40 or like device, located upon the handle standard and likewise over the spring.

The plow is exceedingly simple, it is durable and it is economic, and it is especially adapted for working in hard ground, as for example along the ridges thrown up for planting cotton; and the machine is exceedingly compact, the beam is at some distance from the ground, and below the beam the machine is so narrow that it may be readily leaned either in direction of the right or the left, and it is evident that in operation the opening plow will operate to create a furrow in whatever surface it may be entered, and that the wheel 17 contacting with the ground will when in engagement with the seed box revolve it and cause the seed, or the fertilizer, or both if desired, to be dropped into the furrow made by the plow, while the covering plows at the rear of the machine will effectually close the furrow; and should they meet with any obstruction the covering plows will readily spring upward against the tension of the spring 39 and surmount the obstruction, and when the obstruction is passed the covering plows will automatically return to their normal or lower position. When not in use the yoke standard of the covering plows may be thrown upward, so that the spring 39, will bear upon the opposite side of the crank arm of the standard, and thereby maintain the standard in an upper position.

Having thus described my invention, I claim as new and desire to secure by Letters Patent—

1. In a planter, the combination, with the frame thereof, and a supporting wheel carried by the frame, of a lever fulcrumed upon the frame, a shaft carried by the lever, a seed box shaped substantially as the frustum of a cone, mounted to turn loosely upon the shaft, said seed box comprising a body portion having a surface prepared for frictional and driving engagement with the supporting wheel of the machine, said body being provided with a capped opening at one end and a regulating disk at its opposite end, provided with apertures for the escape of the contents of the box, as and for the purpose set forth.

2. In a planter, the combination, with the frame thereof, the opening plow and its standard, and a supporting wheel journaled at the rear of the said plow, of a lever fulcrumed upon the frame, a guide device for the lever, a shaft carried by the lever, and a seed box held to revolve upon the shaft, said seed box comprising substantially a conical body having a capped opening at one end for the introduction of its contents, and provided at the opposite end with a peripheral bearing surface for frictional engagement with the supporting wheel, a spider located at the opposite end, a regulating disk mounted to turn upon the spiders and provided with outlet apertures capable of being carried over the bars of the spiders, the disk being spring-controlled, and provided with locking devices whereby it may be held in a predetermined position, and whereby also by moving the lever upward or downward the seed box which is independent of the frame of the machine may be adjusted to or from the supporting wheel, as and for the purpose set forth.

3. In a planter, or like machine, the combination, with a fixed support, of a standard having pivotal connection with the support, said standard being adapted to carry covering plows, a crank arm located at the upper end of the standard, and a spring having one end fixed and its free end in constant engagement with the said crank arm, substantially as shown and described, whereby the covering plows will be normally held in covering position but will yield to a positive obstruction in their path, and whereby the plows and standard may be held out of engagement with the ground, as set forth.

4. In a planter or like machine, the combination, with covering plows, and a substantially U or yoke-shaped standard to which the plows are attached, of a fixed support, a pivotal connection between the fixed support and bow section of the standard, a crank arm formed in the bow section of the standard between its pivot points, and a spring fast at one end and having constant engagement at its free end with the crank arm of the standard, the said spring being capable of exerting more or less tension upon the said crank arm, as and for the purpose specified.

JOHN P. ALLEN, Sr.

Witnesses:
LEVI C. HOYL,
J. W. WOOTEN.